Patented Nov. 28, 1944

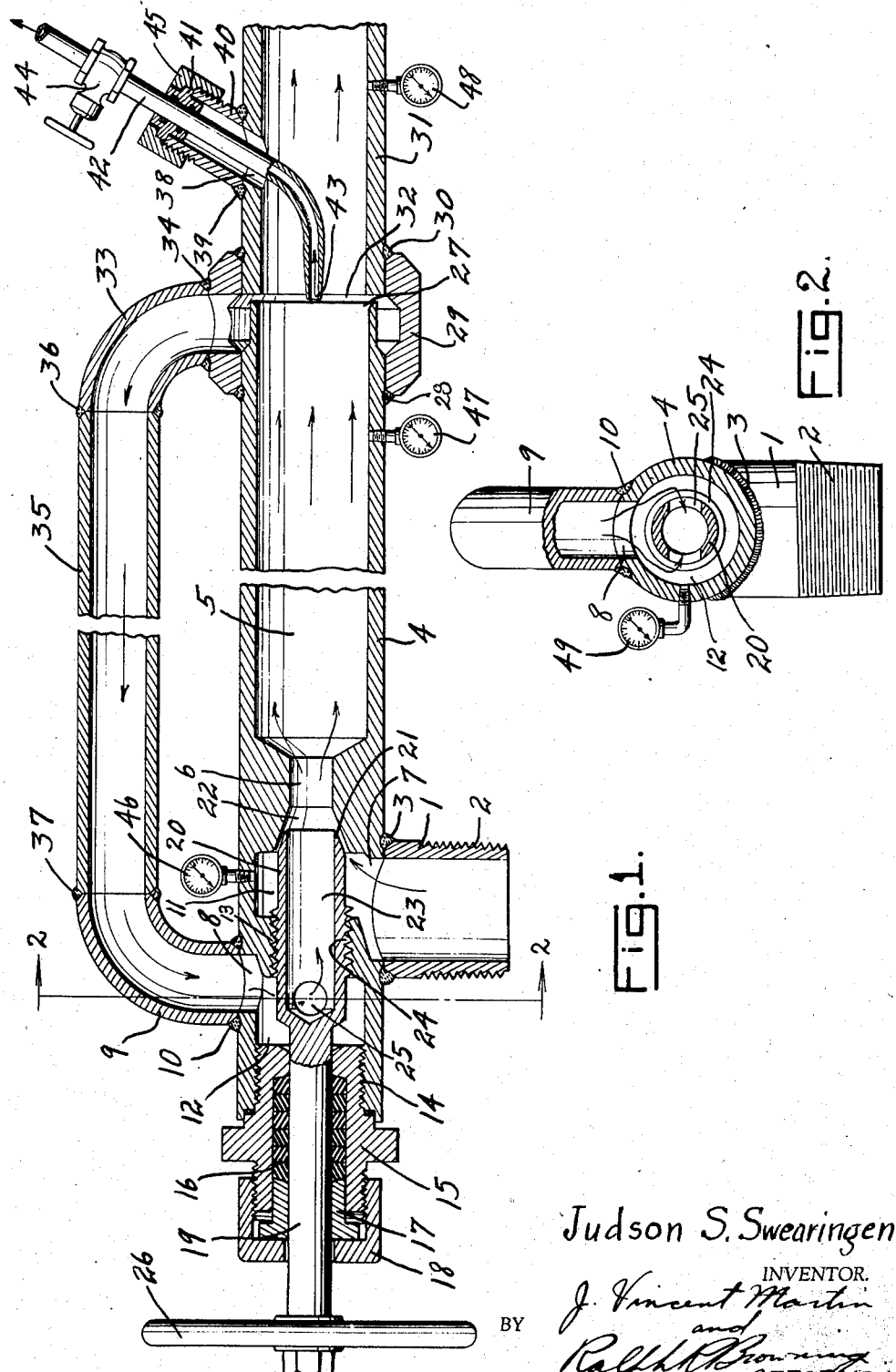
Nov. 28, 1944.   J. S. SWEARINGEN   2,363,625
SAMPLING DEVICE
Filed March 6, 1942
Judson S. Swearingen.
INVENTOR.

2,363,625

UNITED STATES PATENT OFFICE 2,363,625

SAMPLING DEVICE

Judson S. Swearingen, Southton, Tex., assignor to J. Daviss Collett, Jr., Houston, Tex.

Application March 6, 1942, Serial No. 433,687

11 Claims. (Cl. 73—422)

This invention relates to a sampling apparatus and has for its general object the provision of a device for taking a true sample from a flowing stream of a gaseous and liquid mixture.

It is well known that an accurate sample of a flowing stream of a gaseous mixture may be taken by simply tapping the conduit and withdrawing the sample. However, in the case of a mixture of gas and liquid a true sample of the mixture in proper proportion cannot in general be secured in this way as the ordinarily unpredictable character of the kinetics of the flow in the vicinity of the entrance to the sample-collecting device may cause some of the liquid droplets, because of their density, to be thrown clear of the sample-collector thereby leaving the sample deficient in liquid, or an excess of liquid may be thrown into the sample collector as if bombarded by the droplets, or an excessive proportion of liquid may be collected by the sample collector by virtue of a portion of the liquid having collected on the wall of the conduit and having been carried by the force of the stream of gas and entrained liquid to the point of sampling where it literally pours into the sample collector.

A solution to this difficulty is by means of the well-known sharp-edged sample tip inserted into the flowing stream of mixture wherein the opening into the sample tip faces the stream and the linear velocity of the stream entering the sampling tip is the same as that prevailing in the main stream at that point.

However, this method is successful only if all of the liquid is intimately and uniformly dispersed throughout the gaseous phase so that the composition of the stream at the point of sampling is the same as that of the average of the whole stream. It has been found in the flow of such a mixture of gas and liquid that the droplets of liquid each at random may collide with the walls of the conduit and stick, thereby forming a layer of liquid on the wall of the conduit which is in general carried along by the force of the main stream of gas. But this gas with its remaining suspension of liquid is now deficient in liquid and a sample of it would not be a true sample of the composite stream. It has been proposed that a means be provided for causing a violent turbulence in the flowing stream in order to redisperse the consolidated liquid phase, but this means introduces several difficulties. To begin with, the complete dispersion of the liquid phase is very difficult. Also the character of the turbulence is indefinite and a sampling tip cannot be satisfactorily operated near the point of turbulence, and if placed even a short distance from this point of turbulence it will not collect a true sample because some of the liquid will again have reached the walls of the tube and be carried along the wall as a liquid layer as previously indicated where the sampling tip does not have access to it to collect the aliquot part of it.

It is therefore an object of this invention to provide an apparatus whereby a true sample may be taken from a flowing stream of a gas and liquid mixture without the sample being affected by either the collection of liquid upon the walls of the conduit or the high velocity and indeterminate character of the flow adjacent the sampling tip.

Another object of this invention is to provide a sampling apparatus which will not constitute a constriction in the conduit when the sampler is not in use.

Still another object of this invention is to provide a sampling apparatus which will accurately sample a stream of gas and liquid flowing in the same conduit wherein the liquid is not dispersed but is flowing along the bottom or on the walls of the conduit.

Still another object of this invention is to provide a sampling apparatus which will accurately sample a commingled stream of gas and liquid containing a high percentage of liquid.

Still another object of this invention is to provide a sampling apparatus which will disperse any separated liquid with a minimum pressure drop.

Other objects and advantages of this invention will become apparent from the following description taken in connection with the accompanying drawing wherein is set forth one embodiment thereof.

In the drawing:

Fig. 1 shows a longitudinal cross section through a sampling device constructed in accordance with this invention.

Fig. 2 shows a transverse cross section through the same device, taken along the line 2—2 of Fig. 1.

The device illustrated in the drawing is such as would be intended for use by way of example on a flow of a natural distillate gas from a so-called distillate or condensate gas well. It will be appreciated, of course that the device is not limited to such use but that such use is referred to merely by way of example. In such a gaseous and liquid mixture a mixture of hydrocarbon gases comes from the well having entrained therein a substantial content of heavier liquid or vaporous hydrocarbons. At the temperature and pressure at which such gaseous and liquid mixture reaches the surface of the ground the liquid in many instances if not in all instances tends to collect on the walls of the pipe or conduit. This distillate or condensate is carried along by the rapid flow of gas through the conduit but it will readily be seen that due to the presence of this condensate on the walls of the conduit a sample taken from the central portion of the conduit by means of the usual sampling tube would not produce a sample having the true proportions of gaseous and liquid components.

Referring now more particularly to the drawing, a device is provided which consists of an inlet fitting 1 threaded at 2 so that it may be secured to a flow line and having its opposite end welded at 3 to a body 4 that extends at substantially right angles to the fitting 1. The body 4 is provided with a bore 5 having a restriction 6 therein and having a lateral opening 7 which communicates with the fitting 1 and a second lateral opening 8 to which is welded fitting 9 as indicated by the numeral 10. The opening 7 communicates with a chamber 11 in this body, this chamber being closely adjacent the restricted bore portion 6 and the opening 8 communicates with another chamber 12 which is separated from the chamber 11 by a reduced threaded zone 13 which acts as a seal. The end portion of the body 4 adjacent the chamber 12 is interiorly threaded at 14 to receive the stuffing box 15 having packing 16 therein compressed by a gland 17 and gland nut 18. The packing 16 forms a seal about the shaft 19 of an orifice forming member 20 that has a tapering end portion 21 adapted to cooperate with the tapered entrance 22 of the restricting zone 6 so as to provide an annular orifice through which the flow from the fitting 1 must pass in order to enter the flow bore 5 of the fitting 4. This throttling member 20 is hollow as shown at 23 and is threaded at 24 intermediate its ends for engagement with the threads 13 so that upon rotation of the shaft 19 the throttling member 21 will be moved toward and away from the tapered zone 22 to restrict the flow of the mixture entering the device to a greater or less extent as desired. The hollow interior 23 opens adjacent the annular nozzle as illustrated so that the flow of mixture through this annular nozzle will cause a suction through the hollow interior 23 by virtue of the jetting action of the above mentioned stream of mixture as it enters and passes through the constriction or throat 6. The opposite end of this hollow interior is provided with lateral openings 25 into the chamber 12 so that flow through the annular nozzle will tend to cause flow from the fitting 9 through the chamber 12 and out through the hollow interior 23.

The shaft 19 may be adjusted in any suitable manner such as by rotation of the hand wheel 26.

The free end of the body member 4 is provided with a rounded edge 27 and has welded thereabout as shown at 28 a short heavy member 29 forming an annular housing about the end portion of the body 4. The opposite end of this annular housing is welded at 30 to a fitting 31, the adjacent end of which is spaced slightly from the end 27 of the body 4 as shown at 32. The interior of this annular housing 29 is connected by means of an elbow 33 welded thereto at 34 and a nipple 35 welded to the elbow 33 at 36 to the elbow 9.

The nipple 35 is welded at 37 to the elbow 9. It will be seen that by this construction any flow through the inlet fitting 1 and the annular orifice provided by the exterior surface of the member 21 and the tapered portion 22 of the body 4 will not only produce a flow of this fluid through the interior of the body 4 but will cause a suction through the hollow space 23, the openings 25, the chamber 12, the elbows 9 and 33 and the nipple 35 and will cause flow to take place from the interior of the body 4 at the end 27 through the annular opening between said end and the end of the fitting 31 which flow will again be mixed with the flowing stream at the annular jet. The annular opening just referred to must be of such shape and dimensions as to cause the flow into it to be at an accelerated rate over that prevailing in the adjoining main stream so that the pressure at the entrance to this annular opening is reduced and the liquid flowing toward it on the wall 5 will be drawn in.

The fitting 31 is provided with a lateral opening 38 to which is welded at 39 a short nipple 40 having a nut 45 through which is extended a sampling tube 42 fitted with a shoulder 41 and having a sampling nozzle 43 thereon located substantially in the same plane as the annular opening 32 and directed upstream. This sampling tube 42 may be controlled in any suitable manner such as by any cutoff valve 44.

In operation, flow will take place from the distillate well or other source of gas and liquid mixture in through the fitting 1 to the chamber 11 and thence through the annular orifice between the end of the throttling member 21 and the tapered surface 22 through the throat 6. This flow of the mixture will be quite turbulent at this point within the throat 6 and will cause it to take up in a mist or vapor form and to disperse and entrain in the stream of flow substantially all of the liquid which was theretofore more or less separated and flowing along the walls or floor of the conduit. The sampling tube 43, however, cannot for the reasons above set forth be placed in this turbulent zone but must be placed a substantial distance therefrom as illustrated to allow a calming section. It has been found, however, that in this distance an accumulation of liquid on the walls of the conduit again appears in substantial quantities and it becomes necessary in order to get a true sample to take care of this subsequent accumulation of liquid. Moreover it has also been found that complete dispersion of the liquid into the gas is quite difficult by means of a throttling device in the stream, and any liquid not atomized by the action of the constriction formed by the exterior surface of the member 21 and the tapered portion 22 of the body 4 or by the action of the throat 6, will appear on the walls of the bore 5 of the body 4.

As above explained, the flow of the mixture through the annular orifice causes a suction within the hollow portion 23 of the throttling member and this suction tends to cause flow from the annular housing 29 through the conduit that is provided by the elbows 9 and 33 and the nipple 35 into the chamber 12 through the openings 25 and out through the hollow portion 23 into the stream of flow. Due to this suction and flow, any liquid which collects upon the walls of the bore 5 in the body 4 will be carried along by the flow of the main body of the gas until it reaches the annular opening 32 whereupon it will be drawn out of the main stream of flow by the suction referred to and will be carried through the conduit formed by the elbows 9 and 33 and the nipple 35 back around and cause to join the stream of flow at the orifice where it is subjected to violent turbulence in the tapered zone immediately preceding throat 6, as well as in throat 6 and beyond where the high velocity stream emerging from said throat impinges upon the slower moving stream in the bore 5 of body 4. Thus no liquid which is not dispersed in the gas is permitted to pass the point at which the end of the sampling tube 43 is located and from which the sample is taken. However, since this condensate is passed back into the main stream of flow it is not lost but is again mixed with the stream of flow. Conditions will be maintained such that liquid will not accumulate in this recirculation system and since liquid is not permitted to accumulate, there will be the same proportion of gas and liquid passing into the fitting 31 and the sampling tube 43 as that which enters through the fitting 1.

In order to create such conditions, it is necessary to set up the device and begin taking samples with the needle valve wide open and then gradually closing the needle valve while continuing to take samples for each of a number of various positions of the valve. As the valve is closed it will be found that the samples taken will show greater and greater liquid content until a maximum is reached after which it will remain constant as the valve is closed more. The valve should for most efficient operation be closed just slightly beyond this point where the maximum liquid content is found in the sample, so that if the liquid content of the stream should increase slightly, there will still be enough suction in the housing 29 to remove all liquid collected on the walls of the bore 5. The valve should not be closed much beyond this point however, or it will unduly restrict flow of fluid in the main stream.

In order to determine the proper setting of the valve, pressure gauges 46 and 47 communicating with the chamber 11 and the bore 5 respectively are provided whereby the pressure drop through the needle valve and orifice may be observed. Then after the trial samples above referred to have been run and the maximum point determined, the valve may be reset to the proper point by varying its setting until the pressure drop between chamber 11 and bore 5 are slightly greater than when the sample having the maximum liquid content was taken. In order that the pressure downstream from the sampling tip may be observed the pressure gauge 48 communicating with interior of fitting 31 is provided, and the pressure in chamber 12 may be observed by means of the pressure gauge 49 in communication therewith.

It may be noted in connection with this operation that that which actually happens is that the reinjection of the liquid through the hollow portion 23 causes the mixture to be extra rich in liquid beginning at the throat 6 and that it is this extra thickness of the liquid which separates out and is drawn off through the annular space 32 leaving the flow which passes into the fitting 31 and the sampling tube 43 in its true and proper proportion of gas and liquid.

It will be appreciated that while a specific apparatus has been described, this invention is not limited entirely thereto but may be varied so long as there is no substantial departure from the principles involved. Different types of fitting may for example be used depending upon the conditions of pressure, etc. and different types of assembly may be employed. Provision may also be made if desired whereby the sampling tube may be withdrawn when not in use or turned in such a manner that erosion of the sampling nozzle may be reduced to a minimum. An annular type of nozzle has been described in the jet and mixing part of the apparatus but any similar means which accomplishes the dispersion of the liquid in the gas and the circulation of the stream entering at the annular port 32 as described may be used.

In view of the foregoing, it will be appreciated that a device has been provided capable of carrying out fully the objects of this invention.

Having described my invention, I claim:

1. In a sampling device, a conduit, a sample withdrawing device extending into said conduit and having its inlet spaced from the walls thereof, means adjacent the inlet of the sample withdrawing device for collecting all fluid on the wall of said conduit as the fluid flows toward the inlet of said sample withdrawing device, and means associated with the conduit for conveying said collected fluid from the region of collection and introducing the same into and intimately mixing it with a stream of fluid mixture flowing through said conduit toward the inlet of said sample withdrawing device.

2. In a sampling device, a conduit, a sample withdrawing device extending into said conduit and having its inlet spaced from the walls thereof, the walls of said conduit adjacent the inlet of said sample withdrawing device being interrupted throughout substantially its entire circumference, means for withdrawing through said interruption in the walls of the conduit all fluid clinging to said walls and approaching the inlet of said sample withdrawing device and for injecting and intimately mixing said withdrawn fluid with a stream of fluid mixture flowing through said conduit toward the inlet of said sample withdrawing device.

3. In a sampling device for sampling a stream of a mixed fluid one of the constituents of which tends to separate out of the mixture and collect on the walls of a conduit in which it is flowing, a conduit through which the stream flows, a sample withdrawing device extending into said conduit, and means for enriching the stream of fluid flowing toward said sample withdrawing device by returning thereto in advance of said sample withdrawing device the constituents which separate out of said mixture between such point of addition and the inlet to said sample withdrawing device whereby the mixture reaching the inlet of the sample withdrawing device will have the true proportions of all the constituents of the original mixed fluid.

4. In a sampling device, a conduit, means forming a chamber about the exterior of said conduit at one point, said chamber and the interior of said conduit being in communication substantially throughout the circumference of the conduit, means for withdrawing fluid from said chamber and injecting it into said conduit at a position spaced along said conduit from said chamber to mix it with a stream of fluid flowing toward said chamber, and means for taking and withdrawing a sample from said conduit, said means having its inlet located adjacent the plane of the opening between said conduit and said chamber.

5. In a sampling device, a conduit for the flow of a stream of mixed fluids, means for withdrawing from said conduit at a given region thereof any fluid clinging to the walls thereof and carried toward said given region, means for reinjecting all such withdrawn fluid into said conduit to mix it with the stream of fluid flowing toward said region, and a sample withdrawing device having its inlet disposed within said conduit substantially at said region.

6. In a sampling device, means for causing turbulence in a flowing stream of gas and liquid to cause the gas to take up the liquid in the stream and form a substantially homogeneous mixture, a sample withdrawing device extending into the path of flow of said stream at a substantial distance downstream from said point of turbulence, and means for drawing off liquid separating from said stream between said point of turbulence and the location of the sample withdrawing device and returning it to said stream at the point of turbulence.

7. In a sampling device, a conduit, an orifice in said conduit for causing turbulence in a stream of fluid mixture flowing through said conduit, a sample withdrawing device extending into the path of flow of said stream a substantial distance downstream from said orifice, and means for drawing off from said conduit at a position substantially in the same region as said sample withdrawing device any constituents of said mixture which may separate therefrom between said orifice and said sample withdrawing device and for returning the constituents so withdrawn to said stream of fluid mixture prior to its emergence from said orifice.

8. In a sampling device, a conduit, an orifice in said conduit for causing turbulence in a stream of fluid mixture flowing through said conduit, a sample withdrawing device extending into the path of flow of said stream at a substantial distance downstream from said orifice, means communicating with said conduit at a point substantially in the same region as said sample withdrawing device for drawing off any constituent separating from said stream between said orifice and the location of said sample withdrawing device and carried toward the latter by the stream, an injector, and means for conducting constituents withdrawn from the conduit to said injector for reinjecting said separated constituents into the flowing stream of fluid mixture as it enters said orifice.

9. In a sampling device, a conduit, an orifice in said conduit, a hollow needle valve adjustably mounted in the entrance to said orifice for causing a variable annular jet of fluid flowing through said conduit and entering said orifice, a sample withdrawing device extending into said conduit a substantial distance downstream from said orifice, means for withdrawing from said conduit at a position substantially in the same region as said sample withdrawing means any constituents which may have separated out of a fluid mixture passing through said conduit, and means for conducting such separated constituents to the interior of said hollow needle valve whereby the jetting action of the fluid flowing about the outside of said hollow needle valve into said orifice will serve to inject such separated constituents from the interior of said hollow needle valve into said orifice.

10. In a sampling device, a conduit, an orifice, in said conduit, an annular needle valve located adjacent the entrance to said orifice for forming with said orifice an annular jet of fluid flowing through said conduit into said orifice, a shaft carrying said needle valve, threadedly connected with a portion of said conduit, and projecting to the exterior of said conduit, a hand wheel on said shaft exteriorly of said conduit whereby said shaft may be rotated to adjust the position of said needle valve, said needle valve being hollow for a portion of the distance from the end thereof adjacent said orifice, means forming an annular chamber about said conduit at a position spaced downstream from said orifice, said chamber being in communication with the interior of said conduit substantially throughout its circumference, means connecting the interior of said chamber with the interior of said needle valve whereby the jetting action of fluid flowing through said conduit and about said needle valve into said orifice will cause fluid to be withdrawn from the conduit into said chamber and reinjected into the stream of fluid through the interior of said needle valve, and a sample withdrawing device extending into said conduit with its inlet at a position adjacent the region of communication between the conduit and annular chamber.

11. In a sampling device, a conduit for the flow of a stream of fluids, an orifice in said conduit, means for jetting said stream of fluid flowing through said conduit and directing it into said orifice, a sample withdrawing device extending into said conduit a substantial distance downstream from said orifice, means for withdrawing from said conduit at a position substantially in the same region as said sample withdrawing means any constituents which may have separated out of a fluid mixture passing through said conduit, and means for conducting such separated constituents to said jet of fluid entering said orifice, whereby the action of said jet of fluid flowing into said orifice will serve to inject such separated constituents into said orifice with said jet.

JUDSON S. SWEARINGEN.